(12) United States Patent
Mittal et al.

(10) Patent No.: US 11,830,291 B2
(45) Date of Patent: Nov. 28, 2023

(54) SYSTEM AND METHOD FOR MULTIMODAL EMOTION RECOGNITION

(71) Applicant: UNIVERSITY OF MARYLAND, COLLEGE PARK, College Park, MD (US)

(72) Inventors: Trisha Mittal, College Park, MD (US); Aniket Bera, Greenbelt, MD (US); Uttaran Bhattacharya, College Park, MD (US); Rohan Chandra, College Park, MD (US); Dinesh Manocha, Chapel Hill, NC (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 17/173,018

(22) Filed: Feb. 10, 2021

(65) Prior Publication Data

US 2021/0342656 A1 Nov. 4, 2021

Related U.S. Application Data

(60) Provisional application No. 62/972,456, filed on Feb. 10, 2020.

(51) Int. Cl.
*G06V 10/80* (2022.01)
*G06V 40/16* (2022.01)
(Continued)

(52) U.S. Cl.
CPC .......... *G06V 40/174* (2022.01); *G06F 18/213* (2023.01); *G06F 18/2113* (2023.01);
(Continued)

(58) Field of Classification Search
None
See application file for complete search history.

(56) References Cited

U.S. PATENT DOCUMENTS

| 7,760,956 B2 * | 7/2010 | Lin | G06V 20/40 382/254 |
| 8,185,486 B2 * | 5/2012 | Eder | G06Q 10/06375 706/45 |

(Continued)

OTHER PUBLICATIONS

H. Gunes et al., "Bi-modal Emotion Recognition from Expressive Face and Body Gestures", Computer Vision Research Group, Faculty of Information Technology, University of Technology, Sydney, Australia, 12 pages, year 2007. Cited in IDS and provided by applicant. (Year: 2007).*

(Continued)

*Primary Examiner* — Anand P Bhatnagar
(74) *Attorney, Agent, or Firm* — SQUIRE PATTON BOGGS (US) LLP

(57) ABSTRACT

Systems, methods, apparatuses, and computer program products for providing multimodal emotion recognition. The method may include receiving raw input from an input source. The method may also include extracting one or more feature vectors from the raw input. The method may further include determining an effectiveness of the one or more feature vectors. Further, the method may include performing, based on the determination, multiplicative fusion processing on the one or more feature vectors. The method may also include predicting, based on results of the multiplicative fusion processing, one or more emotions of the input source.

12 Claims, 11 Drawing Sheets

(51) Int. Cl.
    *G10L 21/10*    (2013.01)
    *G10L 25/63*    (2013.01)
    *G06F 18/25*    (2023.01)
    *G06F 18/213*    (2023.01)
    *G06F 18/2113*    (2023.01)

(52) U.S. Cl.
    CPC ............ *G06F 18/25* (2023.01); *G06V 10/806* (2022.01); *G10L 21/10* (2013.01); *G10L 25/63* (2013.01)

(56) References Cited

U.S. PATENT DOCUMENTS

| | | | | |
|---|---|---|---|---|
| 8,755,837 | B2* | 6/2014 | Rhoads | H04N 1/2133 |
| | | | | 382/312 |
| 9,008,435 | B2* | 4/2015 | Gokturk | G06F 16/5854 |
| | | | | 382/209 |
| 9,082,162 | B2* | 7/2015 | Gokturk | G06V 10/40 |
| 10,198,505 | B2* | 2/2019 | Frank | G06Q 10/101 |
| 10,198,671 | B1* | 2/2019 | Yang | G06K 9/6274 |
| 10,299,717 | B2* | 5/2019 | Tzvieli | G06F 16/5838 |
| 10,726,306 | B1* | 7/2020 | Yang | G06V 10/25 |
| 11,150,777 | B2* | 10/2021 | Kaehler | G06N 3/02 |
| 2021/0052215 | A1* | 2/2021 | Mouton | A61B 5/7275 |
| 2022/0147535 | A1* | 5/2022 | Frank | G06Q 10/04 |

OTHER PUBLICATIONS

G. Andrew et al., "Deep Canonical Correlation Analysis", Proceedings of the 30th International Conference on Machine Learning, Atlantia, Georgia, 2013, JMLR: W&CP Volums 28, 9 pages.

H. Aviezer et al., "Body Cues, Not Facial Expressions, Discriminate Between Intense Positive and Negative Emotions", Social Sciences Replication Project, Science, 338, pp. 1225-1229, 3 pages.

T. Baltrusaitis et al., "Multimodal Machine Learning: A Survey and Taxonomy", arXiv:1705.09406v2 [cs.LG] Aug. 1, 2017, 20 pages.

C. Busso et al., "IEMOCAP: Interactive Emotional Dyadic Motion Capture Database", Lang Resources & Evaluation (2008) 42:335-359, Nov. 5, 2008, DOI 10.1007/s10579-008-9076-6, 25 pages.

C. Clavel et al., "Fear-type Emotion Recognition for Future Audio-Based Surveillance Systems", www.sciencedirect.com. Speech Communications 50 (2008) 487-503, www.elsevier.com/locate/specom, 17 pages, doi: 10.1016/j.specom.2008.03.012, http://www.research.thalesgroup.com/software/cognitive_solutions/Serket/index.html.

R. Cowie et al., "Emotion Recognition in Human-Computer Interaction", IEEE Signal Processing Magazine, Jan. 2001, 49 pages.

P. Ekman et al., "Head and Body Cues in the Judgment of Emotion: A Reformulation", Perceptual and Motor Skills, 1967, 24, 711-724, Southern Universities Press 1967, 14 pages.

P. Ekman, "Facial Expression and Emotion", 1992 Award Addresses, Apr. 1993, American Psychologist, vol. 48, No. 1, 384-392, 9 pages.

H. Gunes et al., "Bi-modal Emotion Recognition from Expressive Face and Body Gestures", Computer Vision Research Group, Faculty of Information Technology, University of Technology, Sydney, Australia, 12 pages.

H. Hotelling, "Relations Between Two Sets of Variates", Columbia University, Sep. 12, 1935, American Mathematical Society and the Institute of Mathematical Statisticians, 57 pages.

J.R. Kettenring, "Canonical Analysis of Several Sets of Variables", Bell Telephone Laboratories, Murry Hill, Biometrika (1971), 58, 3, 19 pages.

J. Khalfallah et al., "Facial Expression Recognition for Intelligent Tutoring Systems in Remote Laboratories Platform", www.sciencedirect.com, Procedia Computer Science 73 (2015), 274-281, The International Conference on Advanced Wireless, Information, and Communication Technologies (AWICT 2015), doi:10.1016/j.procs.2015.12.030, 8 pages.

Y. Kim et al., "Deep Learning for Robust Feature Generation in Audiovisual Emotion Recognition", Univeristy of Michigan Electrical Engineering and Computer Science, Ann Arbor, Michigan, ICASSP 2013, 5 pages.

J. Kossaifi et al., "AFEW-VA Database for Valence and Arousal Extimation In-The-Wild", Image and Vision Computing xxx (2017) xxx xxx, ScienceDirect, www.elsevier.com/locate/imavis, http://dx.doi.org/10.1016/j.mavis.2017.02.001, 14 pages.

C.W. Lee et al., "Convolutional Attention Networks for Multimodal Emotion Recognition from Speech and Text Data", Proceedings of the First Grand Challenge and Workshop on Human Multimodal Language, pp. 28-34, Melbourne, Australia, Jul. 20, 2018, 7 pages.

K. Liu et al., "Learn to Combine Modalities in Multimodal Deep Learning", arXiv:1805.1173Ov1 [stat.ML] May 29, 2018, 15 pages, https://github.com/skywaLKer518/MultiplicativeMultimodal.

N. Majumder et al., "Multimodal Sentiment Analysis Using Hierarchical Fusion with Context Modeling", Jun. 19, 2018, http://github.com/senticnet, 28 pages.

H. Meeren et al., "Rapid Perceptual Integration of Facial Expression and Emotional Body Language", Cognitive and Affective Neuroscience Laboratory, Tilburg University, Tilburg, The Nethedands, PNAS, Nov. 8, 2005, vol. 102, No. 45, www.pnas.org/cgi/doi/10.1073.pnas.0507650102, 6 pages.

M. Pantic et al., "Affective Multimodal Human-Computer Interaction", MM'05, Nov. 6-11, 2005, Singapore, 8 pages.

F. Ringeval et al., "Introducing the RECOLA Multimodal Corpus of Remote Collaborative and Affective Interactions", 8 pages.

S. Sahay et al., "Multimodal Relational Tensor Network for Sentiment and Emotion Classification", Anticipatory Computing Lab, Intel Labs, Proceedings of the First Grand Challenge and Workshop on Human Mutimodal Language (Challenge-HML), pp. 20-27, Melbourne, Australia, Jul. 20, 2018, 8 pages.

J. Saragih et al., "Face Alignment Through Subspace Constrained Mean-Shifts", The Robotics Institute, Carnegie Mellon University, Pittsburgh, PA, 8 pages.

C. Shan et al., "Beyond Facial Expressions: Learning Human Emotion from Body Gestures", Department of Computer Science, Queen Mary, University of London, 10 pages.

K. Sikka et al., "Multiple Kernel Learning for Emotion Recognition in the Wild", Machine Perception Laboratory, UC San Diego, La Jolla, California, 8 pages.

M. Soleymani et al., "Multimodal Emotion Recognition in Response to Videos", IEEE Transactions on Affective Computing, vol. 3, No. 2, Apr.-Jun. 2012, 13 pages, DOI: 10.1109/T-AFFC.2011.37.

S. Yoon et al., "Speech Emotion Recognition Using Multi-HOP Attention Mechanism", Department of Electrical and Computer Engineering, Seoul National University, Seoul, Korea, 5 pages.

A. Zadeh et al., "Memory Fusion Network for Multi-view Sequential Learning", arXiv:1802.00927v1 [cs.LG] Feb. 3, 2018, Association for the Advancement of Artificial Intelligence (www.aaai.org), 9 pages.

A. Zadeh et al., "Multimodal Language Analysis on the Wild: CMU-MOSEI Dataset and Interpretable Dynamic Fusion Graph", Language Technologies Institute, CMU, Proceedings of the 56th Annual Meeting of the Association for Computational Linguistics (Lang Papers), pp. 2236-2246, Melbourne, Australia, Jul. 15-20, 2018, Association for Computational Linguistics, 11 pages.

* cited by examiner

| Dataset | Method | F1 | MA |
|---|---|---|---|
| IEMOCAP | Kim et al. (2013) | - | 72.8% |
| | Majumdar et al. (2018) | - | 76.5% |
| | Yoon et al. (2019) | - | 77.6% |
| | M3ER | 0.824 | 82.7% |
| CMU-MOSEI | Sahay et al. (2018) | 0.668 | - |
| | Zadeh et al. (2018c) | 0.763 | - |
| | Choi et al. (2018) | 0.895 | - |
| | M3ER | 0.902 | 89.0% |

| Ineffectual modalities? | Experiments | Angry F1 | Angry MA | Happy F1 | Happy MA | Neutral F1 | Neutral MA | Sad F1 | Sad MA | Overall F1 | Overall MA |
|---|---|---|---|---|---|---|---|---|---|---|---|
| No | Original Multiplicative Fusion (Liu et al. 2018) | 0.794 | 80.6% | 0.750 | 76.9% | 0.695 | 68.0% | 0.762 | 80.8% | 0.751 | 76.6% |
| No | M3ER | 0.862 | 86.8% | 0.862 | 81.6% | 0.745 | 74.4% | 0.828 | 88.1% | 0.824 | 82.7% |
| Yes | M3ER – Modality Check Step – Proxy Feature Vector | 0.704 | 71.6% | 0.712 | 70.4% | 0.673 | 64.7% | 0.736 | 79.8% | 0.706 | 71.6% |
| Yes | M3ER – Proxy Feature Vector | 0.742 | 75.7% | 0.745 | 73.7% | 0.697 | 66.9% | 0.778 | 84.0% | 0.741 | 75.1% |
| Yes | M3ER | 0.799 | 82.2% | 0.743 | 76.7% | 0.727 | 67.5% | 0.775 | 86.3% | 0.761 | 78.2% |

FIG. 8(b)

| Ineffectual modalities? | Experiments | Angry F1 | Angry MA | Disgust F1 | Disgust MA | Fear F1 | Fear MA | Happy F1 | Happy MA | Sad F1 | Sad MA | Surprise F1 | Surprise MA | Overall F1 | Overall MA |
|---|---|---|---|---|---|---|---|---|---|---|---|---|---|---|---|
| No | Original Multiplicative Fusion (Liu et al. 2018) | 0.889 | 79.0% | 0.945 | 89.6% | 0.963 | 93.1% | 0.587 | 55.8% | 0.926 | 83.3% | 0.949 | 90.0% | 0.878 | 82.3% |
| No | M3ER | 0.919 | 86.3% | 0.927 | 92.1% | 0.904 | 88.9% | 0.836 | 82.1% | 0.899 | 89.8% | 0.952 | 95.0% | 0.902 | 89.0% |
| Yes | M3ER – Modality Check Step – Proxy Feature Vector | 0.788 | 73.3% | 0.794 | 80.0% | 0.843 | 85.0% | 0.546 | 55.7% | 0.832 | 79.5% | 0.795 | 80.1% | 0.764 | 75.6% |
| Yes | M3ER – Proxy Feature Vector | 0.785 | 77.8% | 0.799 | 83.2% | 0.734 | 77.5% | 0.740 | 77.1% | 0.840 | 86.0% | 0.781 | 83.5% | 0.783 | 80.9% |
| Yes | M3ER | 0.816 | 81.3% | 0.844 | 86.8% | 0.918 | 89.4% | 0.780 | 75.7% | 0.873 | 86.1% | 0.932 | 91.3% | 0.856 | 85.8% |

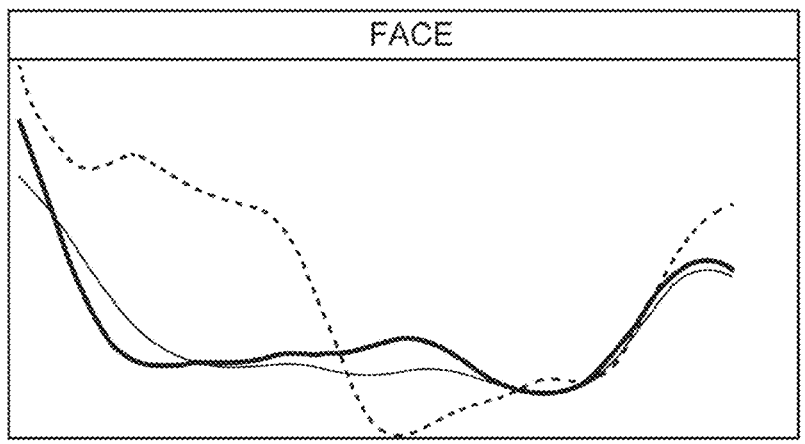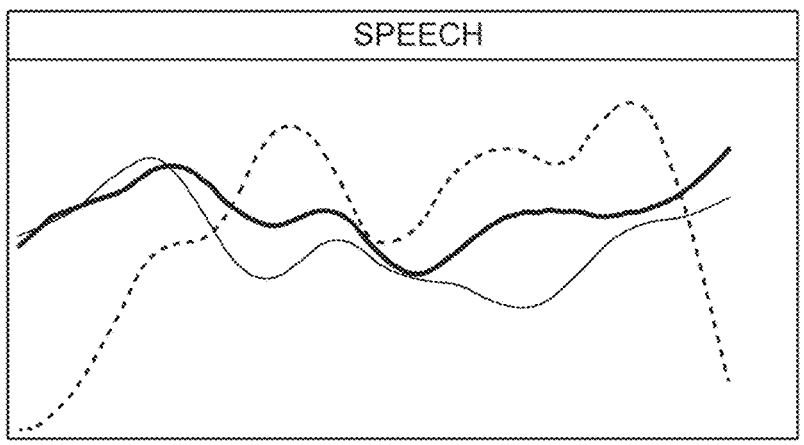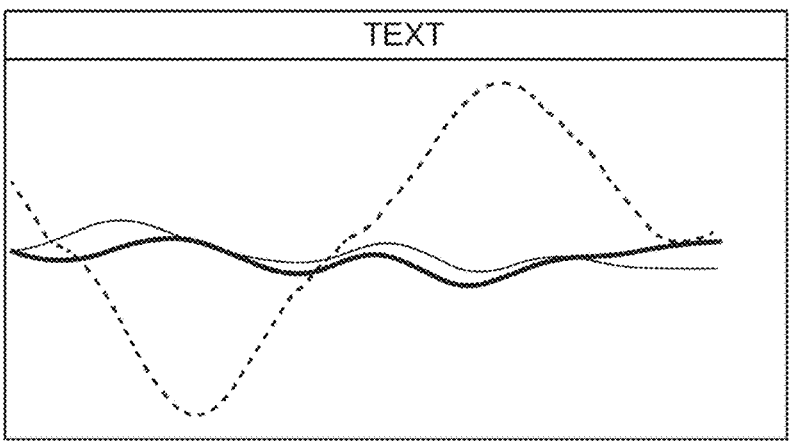
FIG. 9

SYSTEM AND METHOD FOR MULTIMODAL EMOTION RECOGNITION

CROSS-REFERENCE TO RELATED APPLICATIONS

This application claims priority from U.S. provisional patent application No. 62/972,456 filed on Feb. 10, 2020. The contents of this earlier filed application are hereby incorporated by reference in their entirety.

STATEMENT REGARDING FEDERALLY SPONSORED RESEARCH

This invention was made with government support under W911NF1810313 awarded by the Army Research Office. The government has certain rights in the invention.

FIELD

Some example embodiments may generally relate to neural networks. For example, certain example embodiments may relate to apparatuses, systems, and/or methods for multimodal emotion recognition.

BACKGROUND

The perception of human emotions may play a vital role in peoples' everyday lives. People may modify their responses and behaviors based on their perception of the emotions of those around them. For example, one might cautiously approach a person they perceive to be angry, whereas they might be more forthcoming when approaching a person they perceive to be happy and calm. Given the importance of emotion perception, emotion recognition from sensor data can be important for various applications including, for example, human-computer interaction, surveillance, robotics, games and entertainment, and more. Thus, there is a need to address the problem of perceived emotion recognition rather than recognition of the actual emotional state.

SUMMARY

Some example embodiments are directed to a method. The method may include receiving raw input from an input source. The method may also include extracting one or more feature vectors from the raw input. The method may further include determining an effectiveness of the one or more feature vectors. In addition, the method may include performing, based on the determination, multiplicative fusion processing on the one or more feature vectors. Further, the method may include predicting, based on results of the multiplicative fusion processing, one or more emotions of the input source.

Other example embodiments are directed to an apparatus. The apparatus may include at least one processor, and at least one memory comprising computer program code. The at least one memory and the computer program code may be configured, with the at least one processor to cause the apparatus at least to receive raw input from an input source. The apparatus may also be caused to extract one or more feature vectors from the raw input. The apparatus may further be caused to determine an effectiveness of the one or more feature vectors. In addition, the apparatus may be caused to perform, based on the determination, multiplicative fusion processing on the one or more feature vectors. Further, the apparatus may be caused to predict, based on results of the multiplicative fusion processing, one or more emotions of the input source.

Other example embodiments are directed to a computer program, embodied on a non-transitory computer readable medium. The computer program, when executed by a processor, may cause the processor to receive raw input from an input source. The processor may also be caused to extract one or more feature vectors from the raw input. The processor may further be caused to determine an effectiveness of the one or more feature vectors. In addition, the processor may be caused to perform, based on the determination, multiplicative fusion processing on the one or more feature vectors. Further, the processor may be caused to predict, based on results of the multiplicative fusion processing, one or more emotions of the input source.

BRIEF DESCRIPTION OF THE DRAWINGS

For proper understanding of example embodiments, reference should be made to the accompanying drawings, wherein:

FIG. 3 illustrates results of M3ER for emotion recognition, according to certain example embodiments.

FIG. 8($a$) illustrates a table of ablation experiments performed on the IEMOCAP dataset, according to certain example embodiments.

FIG. 8($b$) illustrates a table of ablation experiments performed on the CMU-MOSEI dataset, according to certain example embodiments.

FIG. 9 illustrates a regenerated proxy feature vector, according to certain example embodiments.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for providing multimodal emotion recognition using facial, textual, and speech cues.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Figure 1:
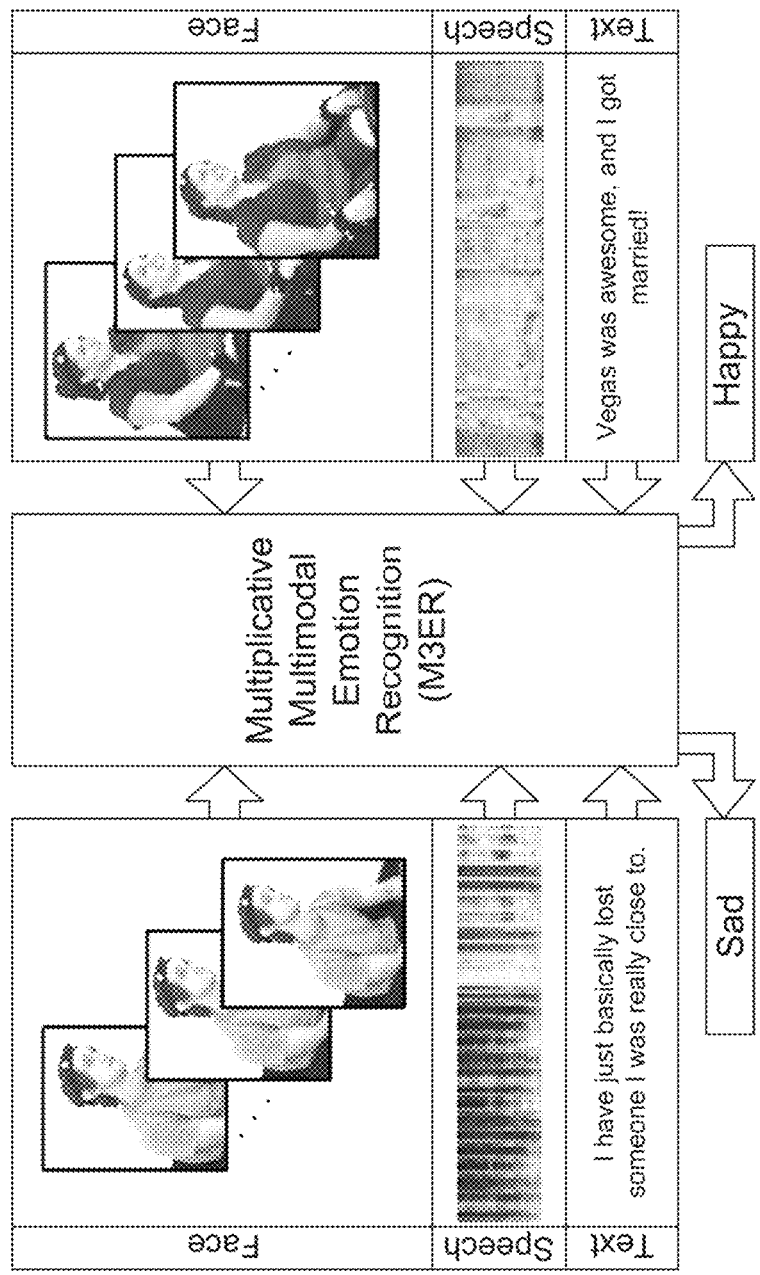
FIG. 1 illustrates an example multimodal perceived emotion recognition procedure, according to certain example embodiments.

FIG. 1 illustrates an example multimodal perceived emotion recognition procedure, according to certain example embodiments. As illustrated in FIG. 1, certain example embodiments may use multiple modalities to perform perceived emotion prediction. For instance, certain example embodiments may use a deep learning model along with a multiplicative fusion method for emotion recognition. According to certain example embodiments, results may be shown on two datasets including, for example, interactive emotional dyadic motion capture (IEMOCAP) and CMU multimodal opinion sentiment and emotion intensity (CMU-MOSEI), both of which have face, speech, and text as the three input modalities. In FIG. 1, one sample point is extracted from the IEMOCAP dataset.

Developing efficient artificial intelligence (AI) systems for perceiving emotions may include combining and collating information from the various modalities by which humans express emotion. These modalities may include, but are not limited to, facial expressions, speech and voice modulations, written text, body postures, gestures, and walking styles. In some cases, it may be desirable to combine more than one modality to infer perceived emotion to achieve richer information and robustness to sensor noise. As to richer information, cues from different modalities can augment or complement each other and, thus, lead to more sophisticated inference algorithms. With regard to sensor noise, information on different modalities captured through sensors can be corrupted due to signal noise, or be missing altogether when the particular modality is not expressed, or cannot be captured due to occlusion, sensor artifacts. Thus, these modalities may be deemed ineffectual, and ineffectual modalities may be especially prevalent in in-the-wild datasets.

Multimodal emotion recognition may include certain challenges. At the outset, it may be beneficial to decide which modalities should be combined and how. Some modalities may be more likely to co-occur than others, and therefore may be easier to collect and utilize together. For example, some of the datasets on multiple modalities, such as IEMOCAP and CMU-MOSEI, may contain commonly co-occurring modalities of facial expressions with associated speech and transcribed text. Other multimodal datasets may also include a subset of these three modalities. Consequently, these modalities may be implemented in certain example embodiments described herein.

Another challenge with multimodal emotion recognition may be the current lack of agreement on the most efficient mechanism for combining (i.e., "fusing") multiple modalities. Some techniques may include early fusion (i.e., "feature-level" fusion) and late fusion (i.e., "decision-level" fusion). Early fusion combines the input modalities into a single feature vector on which a prediction is made. In late fusion methods, each of the input modalities is used to make an individual prediction, which is then combined for the final classification. Certain emotion recognition works have explored early fusion and late fusion techniques in additive combinations. Additive combinations assume that every modality is potentially useful and hence should be used in the joint representation. This assumption makes the additive combination not ideal for in-the-wild datasets which are prone to sensor noise. Hence, certain example embodiments may use a multiplicative combination, which does not make such an assumption. According to certain example embodiments, multiplicative methods may model the relative reliability of each modality on a per-sample basis such that reliable modalities are given higher weight in the joint prediction.

In certain example embodiments, a multimodal emotion recognition algorithm (M3ER) may be provided. In some example embodiments, M3ER may use a data-driven multiplicative fusion technique with deep neural networks. Inputs to the M3ER may include the feature vectors for at least three modalities including but not limited to, for example, face, speech, and text. However, for some example embodiments, the number of modalities may be less than three. According to other example embodiments, M3ER may be modified to be robust to noise, and provide a unique pre-processing step where canonical correlational analysis (CCA) may be used to differentiate between an ineffectual and effectual input modality signal. Certain example embodiments may also provide a feature transformation method to generate proxy feature vectors for ineffectual modalities given the true feature vectors for the effective modalities. This may enable certain example embodiments to work even when some modalities are corrupted or missing.

According to certain example embodiments, performance of M3ER may be on two datasets, IEMOCAP and CMU-MOSEI. As discussed herein, in one example, certain example embodiments may achieve an accuracy of 82.7% on the IEMOCAP dataset and 89.0% on the CMU-MOSEI dataset, which is a collective 5% accuracy improvement on the absolute over conventional methods. Certain example embodiments may also provide ablation experiment results on both datasets, where almost 75% of the data has at least one modality corrupted or missing, to demonstrate the importance of M3ER. As per the annotations in the datasets, IEMOCAP can be classified into four discrete emotions (angry, happy, neutral, sad) and CMU-MOSEI into six discrete emotions (anger, disgust, fear, happy, sad, surprise). According to the continuous space representations, emotions may be seen as points on a 3D space of arousal, valence, and dominance. These discrete emotions may be related to the continuous space through an eigen-transform. Thus, it may be possible to switch between the representations without adding any noise.

In certain example embodiments, the set of modalities may be denoted as $\mathcal{M}$ ={face, text, speech}. The feature vectors for each modality may be denoted as $f_f$, $f_t$, and $f_s$, respectively. Further, the set of predicted emotions may be denoted as $\varepsilon$={happy, sad, angry, neutral}. In addition, the proxy feature vectors generated for speech, text, and face vectors may be represented by $p_s$, $p_t$, $p_f$, respectively. Further, an indicator function may be defined as $I_e(f)$ that outputs either a vector of zero or one of the same dimensions as f, depending on the conditions of the function definition.

Figure 2:
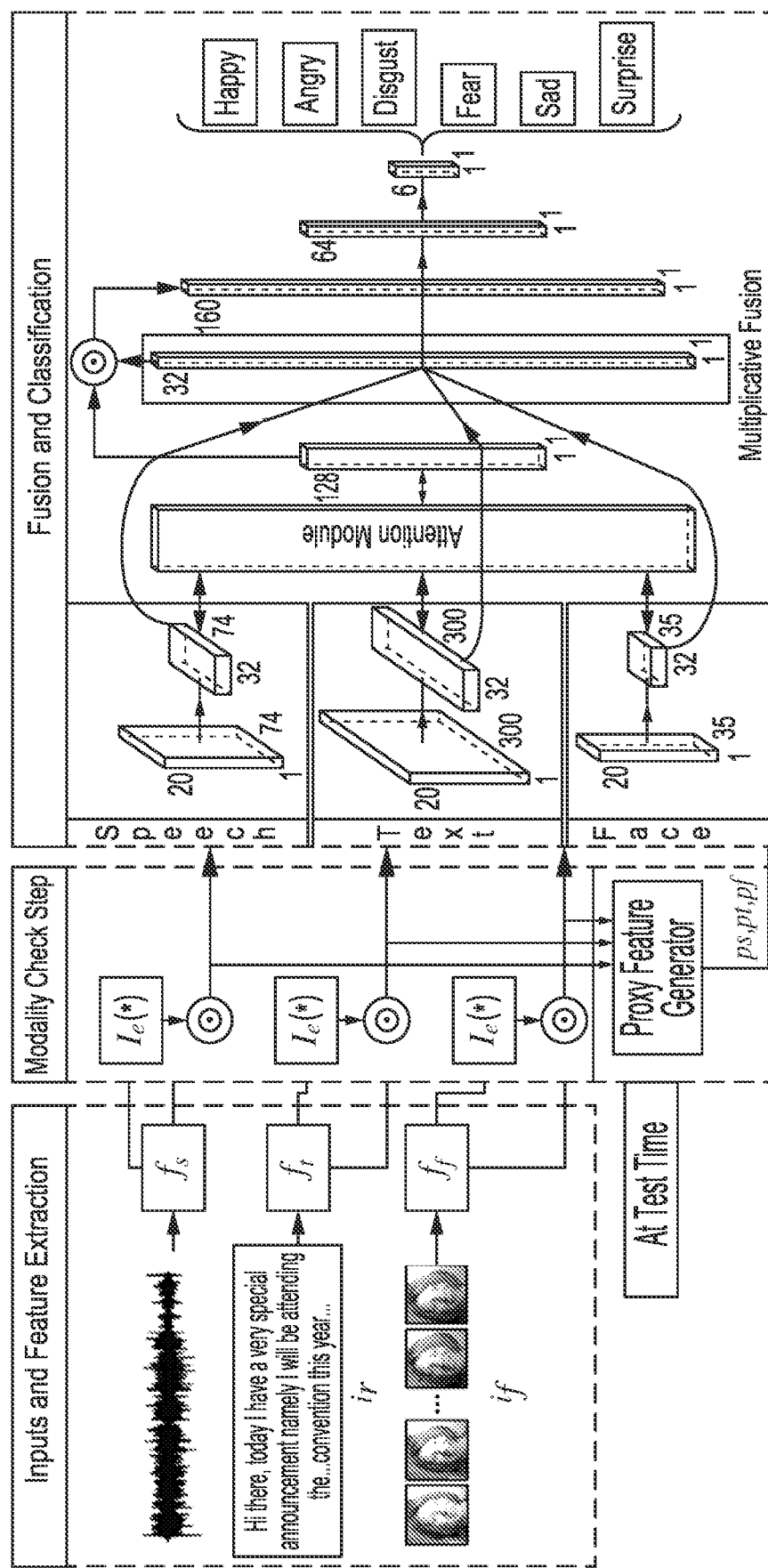
FIG. 2 illustrates an example of a multimodal emotion recognition model (M3ER), according to certain example embodiments.

FIG. 2 illustrates an example of M3ER, according to certain example embodiments. As illustrated in FIG. 2, three modalities may be used including, for example, speech, text and facial features. However, in other example embodiments, more or less modalities may be used. During training, feature vectors $(f_s, f_t, f_f)$ may be extracted from raw inputs $(i_s, i_t, i_f)$. The feature vectors are then passed through the modality check step to distinguish between effective and ineffective signals, and discarding the latter if any. As illustrated in FIG. 2, the feature vectors as returned by the modality check step proceed through three deep-layered feed-forward neural network channels, and pass through the classification and fusion network of M3ER to obtain a prediction of the emotion. At the inference time, if a noisy modality is encountered, a proxy feature vector ($p_s$, $p_t$ or $p_f$) may be generated for that particular modality. In addition, at test time, the data point once again may pass through the modality check step. As noted above, if a modality is deemed ineffectual, a proxy feature vector is regenerated, which is passed to the network for the emotion classification.

According to certain example embodiments, in the modality check step, to enable perceived emotion recognition in real world scenarios, where sensor noise is inevitable, the modality check step can be configured to filter ineffectual data. By filtering ineffectual data, it may be possible to distinguish between features that could be effective for emotion classification (effective features) and features that are noisy (ineffectual features). In doing so, certain example embodiments may use Canonical Correlation Analysis (CCA) to compute the correlation score, $\rho$, of every pair of input modalities. According to certain example embodiments, given a pair of vectors, $f_i, f_j$, with $i, j \in \mathcal{M}$, the projective transformations, $H^i$ and $H^j$, for both feature vectors can be computed, respectively. In addition, these feature vectors, $f_i, f_j$, may be reduced to the same lower dimensions (e.g., 100). As shown below, the projected vector may be obtained by applying a projective transformation. Thus, in the present example, the following may be obtained:

$$f'_i = H_{i,j}{}^i f_i,$$

$$f'_j = H_{i,j}{}^i f_j. \quad (1)$$

According to certain example embodiments, the following correlation score for the pair $\{f_i, f_j\}$ may be computed using formula (2):

$$\rho(f'_i, f'_j) = \frac{cov(f'_i, f'_j)}{\sigma_{f'_i} \sigma_{f'_j}} \quad (2)$$

According to certain example embodiments, the correlation score may be checked against an empirically chosen threshold ($\tau$), and with $\forall i \in m$, it may be possible to check:

$$\rho(f'_i, f'_j) < \tau \quad (3)$$

where $\forall (i,j) \in \mathcal{M}$, $i \neq j$. If the correlation score is less than the chosen threshold ($\tau$), then the feature vector is considered as ineffectual (e.g., ineffectual modality). Otherwise, the feature vector/modality is an effectual modality.

For implementation purposes, the $H_{i,j}{}^i$ for all pairs of modalities may be precomputed based on the training set. At inference time, the projected vectors $f'_i$, $f'_j$ and $\rho(f'_i, f'_j)$ may be computed. Further in certain example embodiments, the correlation may be compared against a heuristically chosen threshold, $\tau$, and introduce the following indicator function:

$$I_e(f_i) = \begin{cases} \mathbb{0} & \rho(f_i, f_j) < \tau, (i,j) \in \mathcal{M}, i \neq j \\ \mathbb{1} & \text{else} \end{cases} \quad (4)$$

For all features, the following operation, $I_e(f) \odot f$, which discards ineffectual features and retains the effective ones. Here, $\odot$ denotes element-wise multiplication.

As previously noted, proxy feature vectors may be regenerated. In certain example embodiments, when one or more modalities have been deemed ineffectual at test time in the modality check step, proxy feature vectors may be generated for the ineffectual modalities using the following equation: $p_i = \mathcal{T} f_i$, where $i = \in \mathcal{M}$ and $\mathcal{T}$ is any linear transformation.

According to certain example embodiments, generating exact feature vectors for missing modalities may pose a challenge due to the non-linear relationship between the modalities. However, certain example embodiments show that by relaxing the non-linear constraint, there exists a linear algorithm that approximates the feature vectors for the missing modalities with high classification accuracy. These resulting vectors may be known as proxy feature vectors.

In certain example embodiments, during test time, the feature vector for the speech modality may be corrupt and identified as ineffectual, while $f_f$ is identified as effective during the modality check step. In this case, certain example embodiments may regenerate a proxy feature vector, $p_s$, for the speech modality. Put differently, a new, unseen face modality feature vector, $f_f$ the set of observed face modality vectors, $\mathcal{F} = \{f_1, f_2, \ldots, f_n\}$, and the set of corresponding observed speech modality vectors, $S = \{s_1, s_2, \ldots, s_n\}$ may be given. In response, certain example embodiments may generate a proxy speech vector, $p_s$, corresponding to $f_f$. According to certain example embodiments, the procedure to generate the proxy vector may begin by preprocessing the inputs to construct bases, $\mathcal{F}_b = \{v_1, v_2, \ldots, v_p\}$ and $\mathcal{S}_b = \{w_1, w_2, \ldots, w_q\}$ from the column spaces of $\mathcal{F}$ and $\mathcal{S}$. Under the relaxed constraint, it may be assumed that there exists a linear transformation, $\mathcal{T}: \mathcal{F}_b \to \mathcal{S}_b$.

The algorithm of certain example embodiments may proceed without assuming knowledge of $\mathcal{T}$. For instance, the first step may be to find $v_j = \text{argmin}_j d(v_j, f_f)$, where d is any distance metric. According to certain example embodiments, the $L_2$ norm in experiment may be selected. This optimization problem may be solved using any distance metric minimization algorithm such as the K-nearest neighbors algorithm. The algorithm of certain example embodiments may also proceed by computing constants $a_i \in \mathbb{R}$ by solving the following linear system, $f_f = \sum_{i=1}^{P} a_i v_i$. Then:

$$p_s = \mathcal{T} f_f = \sum_{i=1}^{p} a_i \mathcal{T} v_i = \sum_{i=1}^{p} a_i w_i \quad (5)$$

According to certain example embodiments, it may be possible to generate proxy vectors from effective feature vectors corresponding to multiple modalities. In this case, the steps described above may be applied to each of the effective feature vectors, and take the mean of both the resulting proxy vectors.

As indicated above, the M3ER may also include a multiplicative modality fusion that combines the three modalities. An idea of multiplicative combination may be to explicitly suppress weaker (not so expressive) modalities, which may indirectly boost the stronger (expressive) modalities. The loss may be defined for the $i^{th}$ modality as follows:

$$c^{(y)} = -\sum_{i=1}^{M} \prod_{j \neq i} \left(1 - p_j^{(y)}\right)^{\beta/(M-1)} \log p_i^{(y)} \qquad (6)$$

where y is the true class label, M is the number of modalities, $\beta$ is the hyperparameter that down-weights the unreliable modalities, and $p_i^{(y)}$ is the prediction for class y given by the network for the $i^{th}$ modality. This indirectly boosts the stronger modalities. However, in certain example embodiments, this concept is reversed to create a modified loss. For instance, according to certain example embodiments, the strong modalities may be boosted in the combination network. In the original formulation, the modified loss was given by equation (6). However, certain example embodiments may show that the modified loss gives better classification accuracies than the originally proposed loss function. In particular, the original loss function attempts to ignore or tolerate the mistakes of the modalities, making wrong predictions by explicitly suppressing them, whereas in certain example embodiments, the wrong predictions may be ignored by simply not addressing them and rather focusing on the modalities that give the right prediction. Furthermore, in the original loss, calculating the loss for each modality may depend on the probability given by all the other modalities. This has a higher computation cost due to the product term. In addition, if either of the input modalities produces an outlier prediction due to noise in the signal, it may affect the prediction of all other modalities. As such, certain example embodiments may provide a modified loss as shown in equation (7):

$$c^{(y)} = -\sum_{i=1}^{M} \left(p_i^{(y)}\right)^{\beta/(M-1)} \log p_i^{(y)} \qquad (7)$$

According to certain example embodiments, this fusion layer may be applied to combine the three input modalities.

In certain example embodiments, M3ER may be a modular algorithm that can work on top of existing networks for multimodal classification. Given a network for multiple modalities, it may be possible to replace the fusion step and incorporate the modality check and proxy vector regeneration of the M3ER, and improve classification accuracies.

According to certain example embodiments, $f_t$ may be extracted from the CMU-MOSEI dataset. In particular, this may be accomplished by using 300-dimensional pre-trained GloVe word embeddings. To compute $f_s$ from the CMU-MOSEI dataset, the 12 Mel-frequency cepstral coefficients, pitch, voiced/unvoiced segmenting features, glottal source parameters may be obtained among others. Further, to obtain $f_f$, certain example embodiments may use the combination of face embeddings obtained from state-of-the-art facial recognition models, facial action units, and facial landmarks for CMU-MOSEI.

Certain example embodiments may train the CU-MOSEI dataset by integrating the multiplicative fusion layer into "Zadeh" memory fusion network (MFN). According to certain example embodiments, each of the input modalities is first passed through single-hidden-layer long short-term memory (LSTMs), and each of output dimension 32. The outputs of the LSTMs along with a 128-dimensional memory variable initialized to all zeros, may be passed into an attention module. The operations inside the attention module may be repeated for a fixed number of iterations t, determined by the maximum sequence length among the input modalities (t=20). The outputs at the end of every iteration in the attention module may be used to update the memory variable a well as the inputs to the LSTMs. After the end of t iterations, the outputs of the 3 LSTMs may be combined using multiplicative fusion to a 32-dimensional feature vector. According to certain example embodiments, the feature vector may be concatenated with the final value of the memory variable, and the resultant 160-dimensional feature vector may be passed through a 64-dimensional fully connected layer followed by a 6-dimensional fully connected layer to generate the network outputs.

In certain example embodiments, the M3ER may be trained on the CMU-MOSEI dataset by splitting the CMU-MOSEI dataset into training (70%), validation (10%), and testing (20%) sets. In addition, a batch size of 256 may be used and trained for 500 epochs. Further, the Adam optimizer may be used with a learning rate of 0.01. For example, the Adam Optimizer may be used for training hyper-parameter values of deep learning networks. The Adam Optimizer may be based on momentum and Root Mean Square propagation.

In certain example embodiments, experiments were performed on the IEMOCAP and the CMU-MOSEI datasets. The IEMOCAP dataset may include text, speech, and face modalities of 10 actors recorded in the form of conversations using a motion capture camera. The conversations include both scripted and spontaneous sessions, and the labeled annotations may include four emotions—angry, happy, neutral, and sad. The CMU-MOSEI dataset may include 23,453 annotated video segments from 1,000 distinct speakers and 250 topics acquired from social media channels. The labels in this dataset may include six emotions—angry, disgust, fear, happy, sad, and surprise.

In certain example embodiments, two standard metrics, F1 scores and mean classification accuracies (MAs), were used to evaluate the methods. According to certain example embodiments, for the IEMOCAP dataset, accuracies are compared with various SOTA methods. A first second-order tolerance analysis (SOTA) method may use two modalities of the IEMOCAP dataset, text and speech, using an attention mechanism that learns to align the relevant text with the audio signal instead of explicitly combining outputs from the two modalities separately. The framework may use two bi-linear LSTM networks. A second SOTA method may focus on feature selection parts and, thus, may use DBNs that are supposedly better equipped at learning high-order non-linear relationships. They empirically show that non-linear relationships help in emotion recognition. A third SOTA method may recognize the need of a more explainable and intuitive method for fusion different modalities. Thus, the third SOTA method proposes a hierarchical fusion that learns bimodal and trimodal correlations for data fusion using deep neural networks.

For the CMU-MOSEI dataset, certain example embodiments compare obtained F1 scores with various SOTA methods including, a first SOTA method that proposes a dynamic fusion graph (DFG) for fusing the modalities. The DFG can model n-modal interactions with an efficient number of parameters. It can also dynamically alter its structure and choose a fusion graph based on the importance of each n-modal dynamics. In the first SOTA method, it is claimed that this is more interpretable fusion as opposed to the naïve late fusion techniques. A second SOTA method may use the text and speech modality of the CMU-MOSEI dataset. Specifically, it may extract feature vectors for text and speech spectrograms using convolutional neural networks (CNNs) architectures. The method may also use a trainable attention mechanism to leaner non-linear dependence between the two modalities. A third SOTA method may propose a tensor fusion network that explicitly models n-modal inter-modal interactions using an n-fold Cartesian product from modality embeddings.

Evaluation of the F1 scores and MAs of the method is summarized in the table illustrated in FIG. 3. In particular, FIG. 3 illustrates results of M3ER for emotion recognition, according to certain example embodiments. FIG. 3 provides a comparison of the F1 scores and the MA of M3ER on the two datasets, IEMOCAP and CMU-MOSEI, with three prior SOTA methods. The numbers not reported by prior SOTA methods are marked with "-". As shown FIG. 3, around 5-10% increase in MA and about 1-23% increase in F1 score were observed.

Figure 4:
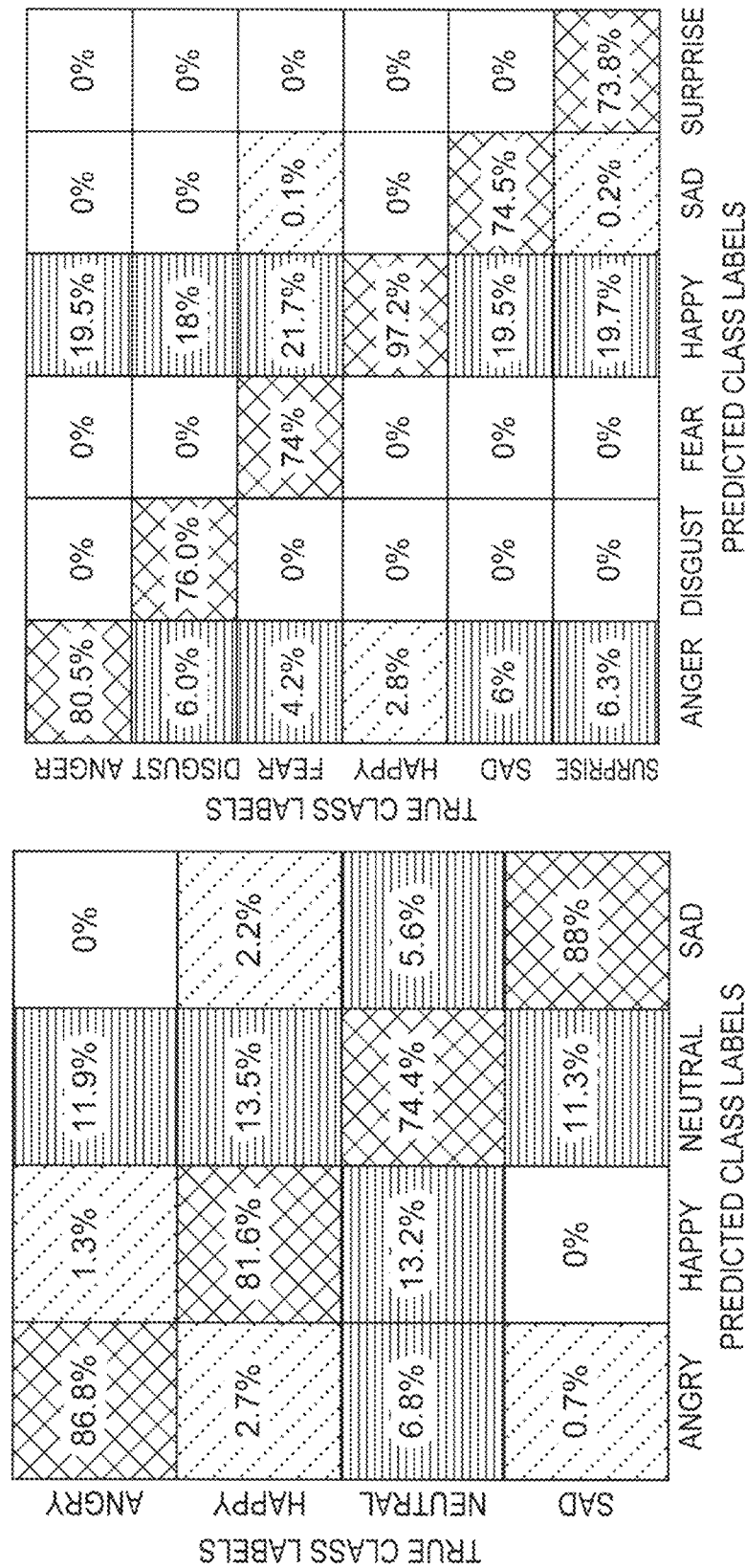
FIG. 4 illustrates a confusion matrix of various emotion classes, according to certain example embodiments.

FIG. 4 illustrates a confusion matrix of various emotion classes, according to certain example embodiments. In particular, the confusion matrix analyzes the per-class performance of M3ER on IEMOCAP and CMU-MOSEI. As shown in FIG. 4, the percentage of inputs belonging to a certain class that were correctly classified by M3ER are shown, and the percentage of inputs that were misclassified into other classes for both the datasets are shown. The left part of FIG. 4 represents the confusion matrix for classification on the IEMOCAP dataset, and the right represents the confusion matrix for the classification on the CMU-MOSEI dataset. As shown in FIG. 4, more than about 73% of the samples per class were correctly classified by M3ER, and no confusions (0%) were observed between certain emotion labels in the two confusion matrices. For instance, "sad" and "happy" in IEMOCAP and "fear" and "surprise" in CMU-MOSEI. It was also observed that a small set of data points were confused between "happy" and "angry" labels for both datasets. The reason for this confusion appears to be that in both situations, people often tend to exaggerate their cues.

In certain example embodiments, experiments were conducted to determine the change of weights per sample point for each modality at the time of fusion to validate the importance of multiplicative fusion. In particular, averaged over all the data points in the test set, when the face modality was corrupted, the average weight for the face modality decreased by about 12%, which was distributed to the other modalities, text and speech. This was expected of the multiplicative layer, for example, to adjust weights for each modality depending on the quality of the inputs.

Figure 5:
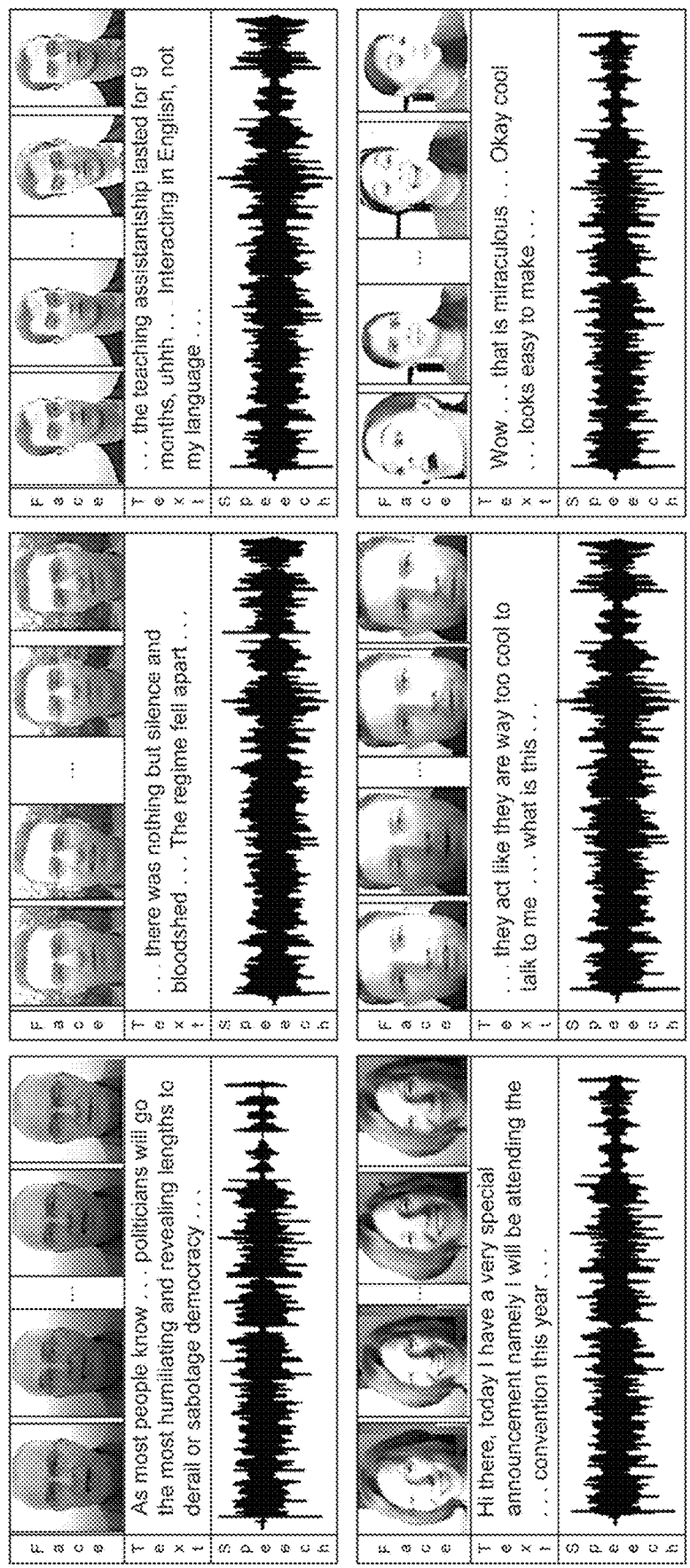
FIG. 5 illustrates qualitative results on the CMU multimodal opinion sentiment and emotion intensity (CMU-MOSEI) dataset, according to certain example embodiments.
Figure 6:
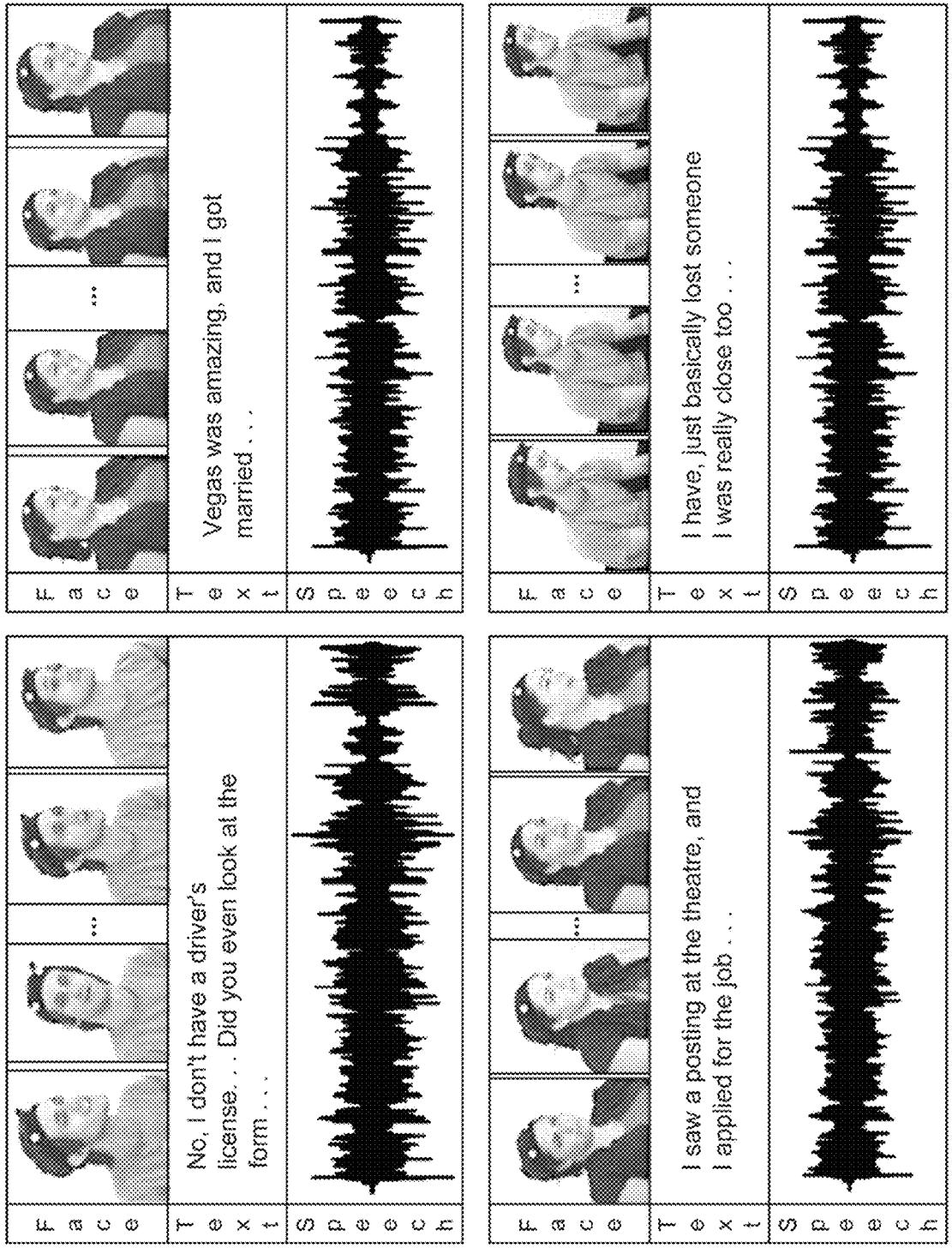
FIG. 6 illustrates qualitative results on interactive emotional dyadic motion capture (IEMOCAP), according to certain example embodiments.
Figure 7:
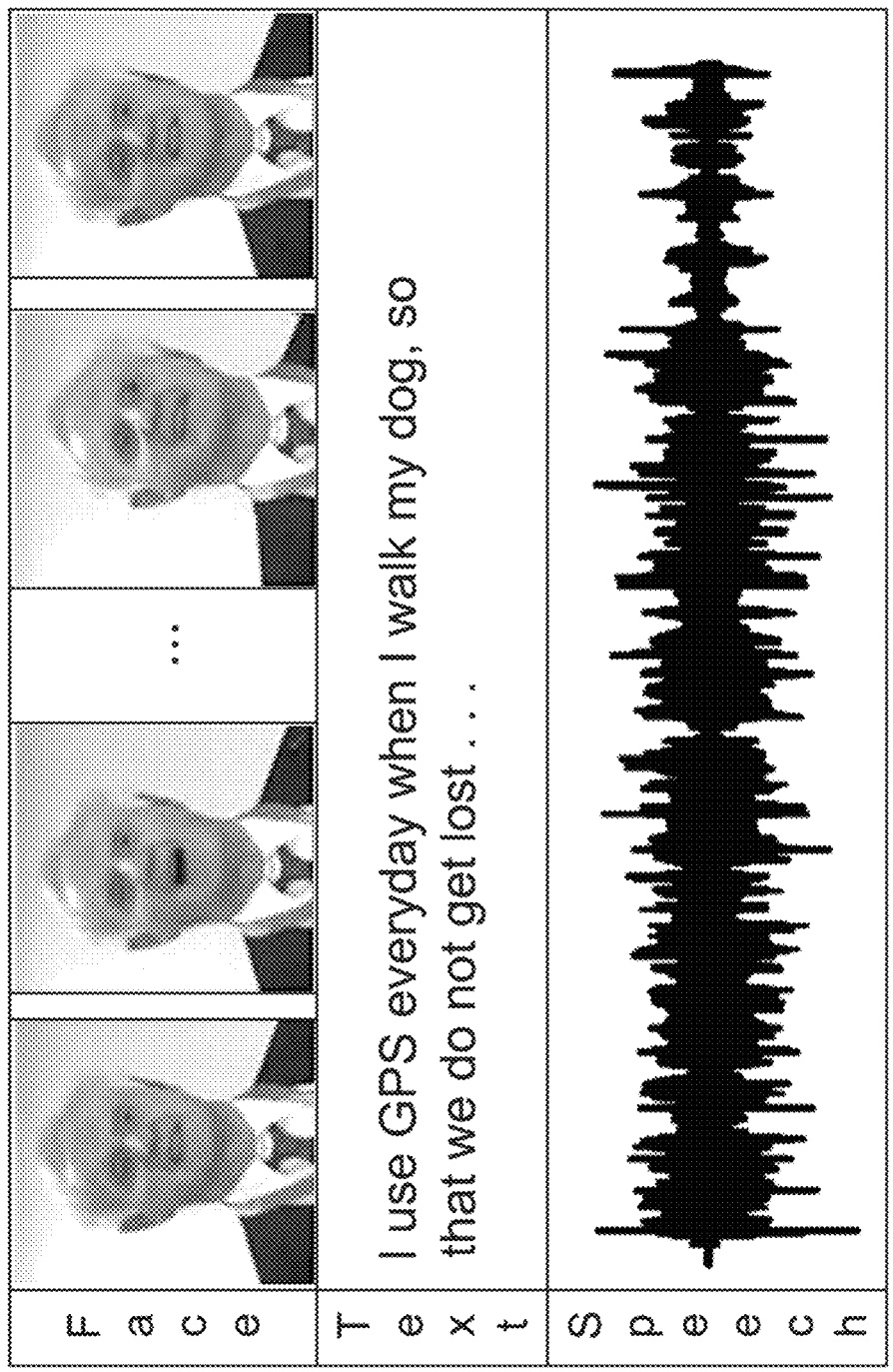
FIG. 7 illustrates a misclassification by M3ER, according to certain example embodiments.

FIG. 5 illustrates qualitative results on the CMU-MOSEI dataset, according to certain example embodiments. In particular, FIG. 5 illustrates data points correctly classified by M3ER from the six class labels of CMU-MOSEI. The labels as classified by M3ER in row order from top left, are anger, disgust, fear, happy, sad, and surprise. As illustrated in FIGS. 5, 6, and 7, sample frames of the facial expressions are presented along with the transcript of the text and the audio signal for one example of each class of the dataset.

FIG. 6 illustrates qualitative results on IEMOCAP, according to certain example embodiments. In particular, FIG. 6 illustrates qualitative data points correctly classified by M3ER from the four class labels of IEMOCAP. The labels as classified by M3ER in row order from top left, are angry, happy, neutral, and sad.

FIG. 7 illustrates a misclassification by M3ER, according to certain example embodiments. In particular, FIG. 7 illustrates that the text and face input of a "happy" data point from CMU-MOSEI dataset that the M3ER model misclassified as "angry". Here, the man is giving a funny speech with animated and exaggerated facial looks, which appear informative, but resulted in a wrong class label.

In certain example embodiments, ablation experiments for original and M3ER multiplicative fusion loss were evaluated and compared. For example, the original multiplicative fusion loss (equation (2)) was compared with the modified loss (equation (3)) on both IEMOCAP and CMU-MOSEI datasets. FIG. 8($a$) illustrates a table of ablation experiments performed on the IEMOCAP dataset, according to certain example embodiments. Further, FIG. 8($b$) illustrates a table of ablation experiments performed on the CMU-MOSEI dataset, according to certain example embodiments. As illustrated in FIGS. 8($a$) and 8($b$), in the ablation experiments, one component of M3ER was removed at a time, and the F1 and MA scores were reported on the IEMOCAP and the CMU-MOSEI datasets to showcase the effect of each of these components. As can be seen from these figures, modifying the loss function leads to an increase of about 6-7% in both the F1 and MA scores. Further, adding the modality check step on the datasets with ineffectual modalities leads to an increase of about 2-5% in F1 and 4-5% in MA, and adding the proxy feature regeneration step on the same datasets leads to a further increase of about 2-7% in F1 and about 5-7% in MA. In some example embodiments, to motivate the necessity of checking the quality of signals from all the modalities and implementing corrective measures in the case of ineffectual features, the datasets were corrupted by adding white Gaussian noise with a signal-to-noise ratio of about 0.01 to at least one modality in approximately 75% of the samples in the datasets. The performance of the various ablated versions of M3ER were then compared, as summarized in the tables illustrated in FIGS. 8($a$) and 8($b$).

According to certain example embodiments, in the M3ER modality check step and proxy feature vector, the multiplicative fusion may be applied with the modified loss on the datasets. This results in a drop of 4-12% in the overall F1 score, and 9-12% in the overall MA from the non-ablated version of M3ER. Further, in the M3ER proxy feature vector, the modality check step may perform this step to filter out the ineffectual modality signals. This results in an improvement of about 2-5% in the overall F1 score, and about 4-5% in the overall MA from the other versions. However, the filtered out modalities are not replaced with generated proxy features, thus having fewer modalities to work with. This results in a drop of about 2-7% in the overall F1 score and about 5-7% in the overall MA from the non-ablated version of M3ER.

FIG. 9 illustrates a regenerated proxy feature vector, according to certain example embodiments. In particular, FIG. 9 illustrates the quality of the regenerated proxy feature vectors for each of the three modalities. The three graphs illustrated in FIG. 9 demonstrate the original feature vector, the ineffectual version of the modality because of added white Gaussian noise, and the regenerated feature vector. The mean $L_2$ norm distance between the original and the regenerated vector for the speech, text, and face modality are all about 0.01% of the $L_2$ norm of the respective data. Further, according to certain example embodiments, with all the components of M3ER in place, it may be possible to achieve an overall F1 score of about 0.761 on IEMOCAP datasets and about 0.856 on CMU-MOSEI datasets, and an overall MA of about 78.2% on IEMOCAP datasets and about 85.0% on CMU-MOSEI datasets.

Figure 10:
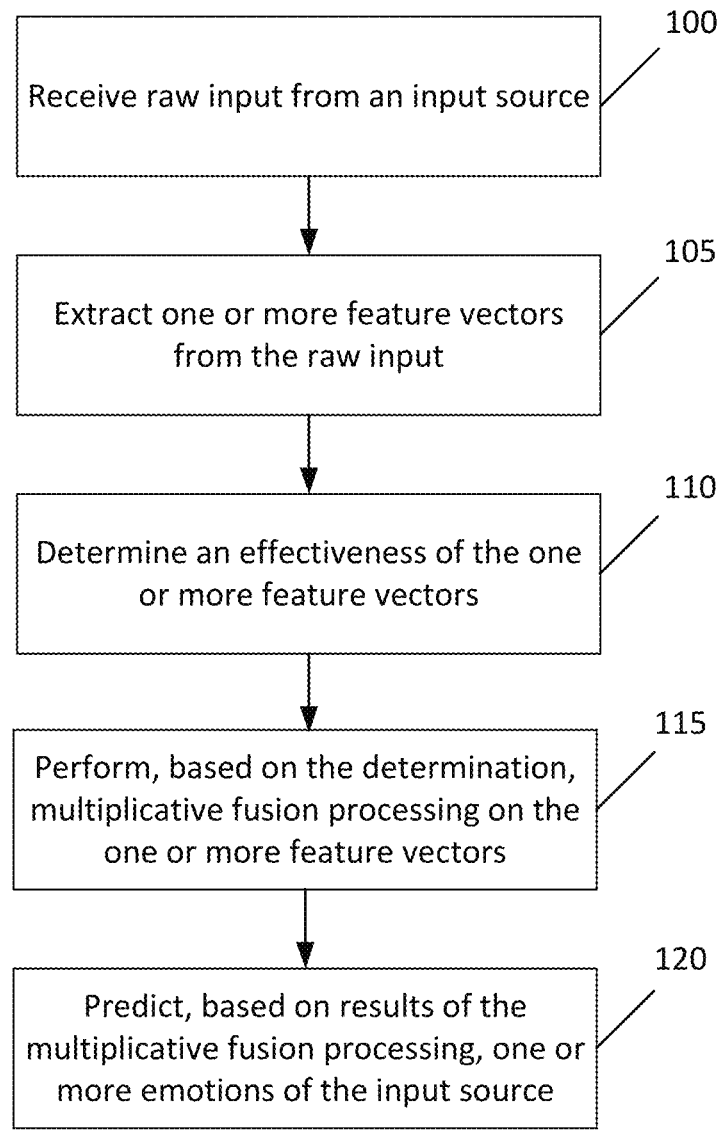
FIG. 10 illustrates a flow diagram of a method, according to certain example embodiments.

FIG. 10 illustrates an example flow diagram of a method, according to an example embodiment. In certain example embodiments, the flow diagram of FIG. 10 may be performed by a computing device, for instance similar to apparatus 10 illustrated in FIG. 11. According to one example embodiment, the method of FIG. 10 may include, at 100, receiving raw input from an input source. The method may also include, at 105, extracting one or more feature vectors from the raw input. The method may further include, at 110, determining an effectiveness of the one or more feature vectors. In addition, the method may include, at 115, performing, based on the determination, multiplicative fusion processing on the one or more feature vectors. Further, the method may include, at 120, predicting, based on results of the multiplicative fusion processing, one or more emotions of the input source.

According to certain example embodiments, the raw input may include one or more modalities. According to other example embodiments, the multiplicative fusion processing may include combining the one or more feature vectors with another one or more feature vectors, boosting one or more of the one or more feature vectors, and suppressing one or more of the one or more feature vectors.

In certain example embodiments, determining the effectiveness of the one or more feature vectors may include computing a correlation score for the one or more feature vectors, and checking the correlation score against a predetermined threshold. In other example embodiments, determining the effectiveness of the one or more feature vectors may include determining that the one or more feature vectors is effective, and determining that the one or more feature vectors is ineffective. In some example embodiments, when the one or more feature vectors is determined to be ineffective, the method may further include generating one or more proxy feature vectors for the one or more ineffective feature vectors.

Figure 11:
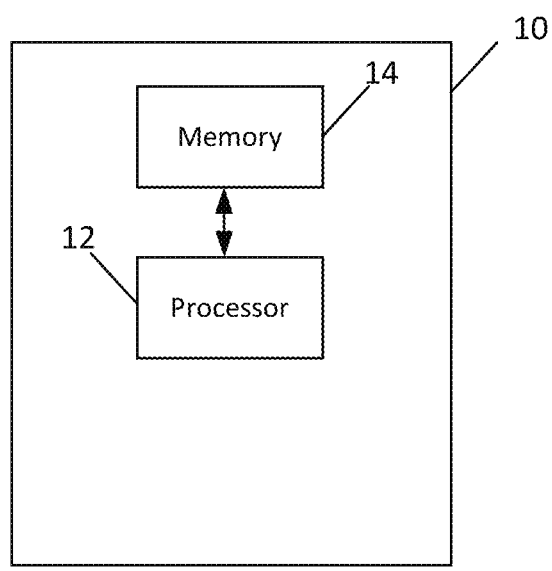
FIG. 11 illustrates an apparatus, according to certain example embodiments.

FIG. 11 illustrates an apparatus 10 according to an example embodiment. In an embodiment, apparatus 10 may be a computing device (e.g., a workstation or a server) that runs an artificial neural network (ANN). According to certain example embodiments, the ANN may be a software program that can be executed on the computing device's processor, and may be designed and trained to read input data and map it to the target emotions. As one example, apparatus 10 may be implemented in, for instance, a workstation, a laptop, a mobile device, or other similar computing device.

In some example embodiments, apparatus 10 may include one or more processors, one or more computer-readable storage medium (for example, memory, storage, or the like), and/or a user interface. It should be noted that one of ordinary skill in the art would understand that apparatus 10 may include components or features not shown in FIG. 11.

As illustrated in the example of FIG. 11, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 11, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-10.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-10.

Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, processor 12 and memory 14 may be included in or may form a part of processing circuitry or control circuitry.

Certain example embodiments described herein provide several technical improvements, enhancements, and/or advantages. In some example embodiments, it may be possible to provide a multimodal emotion recognition model that uses a multiplicative fusion layer. According to certain example embodiments, the M3ER is robust to sensor noise because of a modality check step that distinguishes between good and bad signals to regenerate a proxy feature vector for bad signals. Certain example embodiments also provide a multiplicative fusion to decide on a per-sample basis which modality should be relied on more for making a prediction. Other example embodiments of the M3ER may demonstrate an efficiency on IEMOCAP and CMU-MOSEI datasets by achieving a mean accuracy of about 82.7% on IEMOCAP, and about 89.0% on CMU-MOSEI datasets, which, collectively is an improvement of about 5% over conventional works.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments.

Partial Glossary

CMU-MOSEI CMU Multimodal Opinion Sentiment and Emotion Intensity

IEMOCAP Interactive Emotional Dyadic Motion Capture

We claim:

1. A method, comprising:
receiving raw input from an input source;
extracting one or more feature vectors from the raw input;
determining an effectiveness of the one or more feature vectors based at least in part on
computing a correlation score for the one or more feature vectors,
checking the computed correlation score against a predetermined threshold, and
a signal noise level,
wherein when the correlation score is above the threshold, the one or more feature vectors is ineffective, and
wherein when the correlation score is below the threshold, the one or more feature vectors is effective;
performing, based on the determination, multiplicative fusion processing on the one or more feature vectors; and
predicting, based on results of the multiplicative fusion processing, one or more emotions of the input source.

2. The method according to claim 1, wherein the raw input comprises one or more modalities.

3. The method according to claim 1, wherein the multiplicative fusion processing comprises:
combining the one or more feature vectors with another one or more feature vectors;
boosting one or more of the one or more feature vectors; and
suppressing one or more of the one or more feature vectors.

4. The method according to claim 1, wherein, when the one or more feature vectors is determined to be ineffective, the method further comprises generating one or more proxy feature vectors for the one or more ineffective feature vectors.

5. An apparatus, comprising:
at least one processor; and
at least one memory comprising computer program code,
the at least one memory and the computer program code are configured, with the at least one processor to cause the apparatus at least to
receive raw input from an input source;
extract one or more feature vectors from the raw input;
determine an effectiveness of the one or more feature vectors based at least in part on
computing a correlation score for the one or more feature vectors,
checking the computed correlation score against a predetermined threshold, and
a signal noise level,
wherein when the correlation score is above the threshold, the one or more feature vectors is ineffective, and
wherein when the correlation score is below the threshold, the one or more feature vectors is effective;
perform, based on the determination, multiplicative fusion processing on the one or more feature vectors; and
predict, based on results of the multiplicative fusion processing, one or more emotions of the input source.

6. The apparatus according to claim 5, wherein the raw input comprises one or more modalities.

7. The apparatus according to claim 5, wherein, in the multiplicative fusion processing, the at least one memory and the computer program code are further configured, with the at least one processor to cause the apparatus at least to:
combine the one or more feature vectors with another one or more feature vectors;
boost one or more of the one or more feature vectors; and
suppress one or more of the one or more feature vectors.

8. The apparatus according to claim 5, wherein, when the one or more feature vectors is determined to be ineffective, the one or more feature vectors, the at least one memory, and the computer program code are further configured, with the at least one processor, to cause the apparatus at least to generate one or more proxy feature vectors for the one or more ineffective feature vectors.

9. A computer program, embodied on a non-transitory computer readable medium and executable by a processor, wherein, the computer program, when executed by the processor, causes the processor to:
receive raw input from an input source;
extract one or more feature vectors from the raw input;
determine an effectiveness of the one or more feature vectors based at least in part on
computing a correlation score for the one or more feature vectors,
checking the computed correlation score against a predetermined threshold, and
a signal noise level,
wherein when the correlation score is above the threshold, the one or more feature vectors is ineffective, and
wherein when the correlation score is below the threshold, the one or more feature vectors is effective;
perform, based on the determination, multiplicative fusion processing on the one or more feature vectors; and
predict, based on results of the multiplicative fusion processing, one or more emotions of the input source.

10. The computer program according to claim 9, wherein the raw input comprises one or more modalities.

11. The computer program according to claim 9, wherein in the multiplicative fusion processing, the processor is further caused to:
combine the one or more feature vectors with another one or more feature vectors;
boost one or more of the one or more feature vectors; and
suppress one or more of the one or more feature vectors.

12. The computer program according to claim 9, wherein when the one or more feature vectors is determined to be ineffective, the processor is further caused to generate one or more proxy feature vectors for the one or more ineffective feature vectors.

* * * * *